United States Patent [19]
Glasgow

[11] Patent Number: 5,601,705
[45] Date of Patent: Feb. 11, 1997

[54] SKIMMER/COALESCHER SYSTEM FOR REMOVING AND SEPARATING TRAMP OIL FROM AN AQUEOUS COOLANT

[76] Inventor: James A. Glasgow, 7481 N. Timberline Dr., Cincinnati, Ohio 45243

[21] Appl. No.: 466,388

[22] Filed: Jun. 6, 1995

[51] Int. Cl.$^6$ ................................................. C02F 1/40
[52] U.S. Cl. ...................... 210/104; 210/122; 210/242.3; 210/521; 210/540
[58] Field of Search ............................... 210/192, 242.1, 210/242.3, 256, 258, 259, 307, 521, 538, 540, 104, 122, 123

[56] References Cited

U.S. PATENT DOCUMENTS

| | | | |
|---|---|---|---|
| 554,815 | 2/1896 | Field | 210/521 |
| 1,164,527 | 12/1915 | Kelly, Jr. | 210/540 |
| 1,200,951 | 10/1916 | Kelly, Jr. | 210/540 |
| 1,672,583 | 6/1928 | Travers . | |
| 2,181,684 | 11/1939 | Walker | 210/521 |

(List continued on next page.)

FOREIGN PATENT DOCUMENTS

| | | |
|---|---|---|
| 0415121A1 | 3/1991 | European Pat. Off. . |
| 2426288 | 12/1979 | France . |
| 1484845 | 9/1969 | Germany . |

OTHER PUBLICATIONS

Wastewater Engineers, Inc., Introductory Letter with 5 sheets background informatrion "Oil Skimmers", Abanaki Corporation, Oil Skimmer Division, 9 pages.
E&K Sales, Inc., Carol Company, "Tramp Oil Disc Skimmer", Apr. 1, 1993 6 pages.
"Parallel Plate Coalescing Systems for Phase Separation", PhaSep—Phase Separation Systems, 1987, 8 pages.
Wayne Products, Inc., "Skinni–Mini", Drum Oil Skimmer, 14 pages.
Facet International, "Engineering Clear Solutions for Environmental Clean–up —Coalescing Plate Separators": MAS Series, 8 pages.
Dyna Tech Chemical Specialties, Inc., The Coolant Manager, 2 pages.
Modern Machine Shop advertisement, Burke, Standard and Custom Milling Machines, 1 page.
Modern Machine Shop advertisement, Master Products, Master Oil Skimmer, 1 page.
Modern Machine Shop advertisement ENERPAC Hydraulic Technology Worldwide, Turbo Air Pump, 1 page.
Modern Machine Shop advertisement for Zebra Skimmers, Big Dipper—Disk Oil Lifter, 1 page.
Douglas Engineering Coolant Recycling Systems, Skim-–Pak skimmers and Trap Oil Separators, 7 pages.
CLC Lubricants, Li'l Tramp Skimmer/Aerator, 2 pages.
Skimmers, "Rising Sump Skimmer", 2 page brochure with Copy of two photographs.

*Primary Examiner*—Christopher Upton
*Attorney, Agent, or Firm*—Wood, Herron & Evans, P.L.L.

[57] ABSTRACT

A skimmer/coalescer system includes a skimmer which skims a two-component liquid from the surface of a liquid mixture in a tank, and a pump which pumps the skimmed liquid to a coalescer for separating and collecting a lower density liquid component from the mixture and returning the rest of the liquid to the tank. The skimmer includes a housing submerged below the liquid surface in the tank, an outlet operatively connected to the pump and an intake which supplies liquid to the housing by gravity. The intake includes a vertically movable inlet which remains adjacent the liquid surface regardless of liquid level changes in the tank, thereby to skim near the surface where the lower density liquid dominates, and to enhance skimming efficiency. The skimmer also includes a sensor inside the submerged housing which cooperates with the intake to expand or contract the size of the inlet to increase or decrease in-flow to the housing, respectively, depending on whether the liquid level in the submerged housing is receding or raising. This maintains consistent and continuous liquid flow through the system during operation and minimizes the possibility of pump damage.

15 Claims, 5 Drawing Sheets

U.S. PATENT DOCUMENTS

| | | | |
|---|---|---|---|
| 2,585,878 | 2/1952 | Tryon | 310/540 |
| 2,747,736 | 5/1956 | Mobley | 210/540 |
| 3,303,932 | 2/1967 | Hirs et al. . | |
| 3,688,909 | 9/1972 | Titus et al. . | |
| 3,849,308 | 11/1974 | Westerman . | |
| 3,849,311 | 11/1974 | Jakubek | 210/521 |
| 3,923,661 | 12/1975 | Crisafulli . | |
| 3,933,654 | 1/1976 | Middelbeek . | |
| 3,951,810 | 4/1976 | Crisafulli . | |
| 3,970,556 | 7/1976 | Gore . | |
| 4,024,063 | 5/1977 | Mori . | |
| 4,064,054 | 12/1977 | Anderson et al. . | |
| 4,122,016 | 10/1978 | Tao et al. | 210/540 |
| 4,123,365 | 10/1978 | Middelbeek . | |
| 4,132,645 | 1/1979 | Bottomley et al. | 210/540 |
| 4,132,651 | 1/1979 | deJong . | |
| 4,224,162 | 9/1980 | Ayroldi . | |
| 4,265,759 | 5/1981 | Verpalen et al. | 210/307 |
| 4,301,008 | 11/1981 | Baffert et al. . | |
| 4,400,274 | 8/1983 | Protos . | |
| 4,405,458 | 9/1983 | McHugh, Jr. . | |
| 4,554,074 | 11/1985 | Broughton . | |
| 4,636,320 | 1/1987 | Figiel et al. . | |
| 4,728,440 | 3/1988 | van Kuijeren . | |
| 4,746,424 | 5/1988 | Drew . | |
| 4,755,292 | 7/1988 | Merriam | 210/192 |
| 4,769,131 | 9/1988 | Noll et al. | 210/192 |
| 4,797,210 | 1/1989 | Lonardo . | |
| 4,867,872 | 9/1989 | Russell et al. | 210/540 |
| 4,892,666 | 1/1990 | Paulson . | |
| 4,956,100 | 9/1990 | Mikkleson . | |
| 5,030,342 | 7/1991 | Ortega . | |
| 5,053,145 | 10/1991 | Ellison . | |
| 5,059,312 | 10/1991 | Galletti . | |
| 5,066,407 | 11/1991 | Furlow . | |
| 5,154,835 | 10/1992 | DeMichael . | |
| 5,160,605 | 11/1992 | Noestheden . | |
| 5,378,376 | 1/1995 | Zenner . | |
| 5,397,472 | 3/1995 | Bouchard . | |
| 5,451,330 | 9/1995 | Garrett | 210/242.3 |

SKIMMER/COALESCHER SYSTEM FOR REMOVING AND SEPARATING TRAMP OIL FROM AN AQUEOUS COOLANT

FIELD OF THE INVENTION

The background of U.S. Pat. No. 5,053,145 provides a good description of the field to which this invention relates. Namely, this field involves the removing of tramp oil from aqueous solutions used as coolants in machining centers and those used as cleaning fluids to wash metal parts.

BACKGROUND OF THE INVENTION

In many machining operations, an aqueous coolant is sprayed or flowed at the location where a cutting tool engages the workpiece, for lubrication and cooling purposes. The coolant is then collected in a tank located below the machine and recycled for continuous use for as long as possible.

Aqueous coolants of this type are fairly expensive, so it is advantageous to maintain such aqueous coolants in usable condition for as long as possible. Typical machining operations also include lubricating oil for lubricating movable parts. Eventually, this oil drips or flows into the aqueous coolant tank, where it floats upon the surface of the aqueous coolant due to its lighter weight and lower density. This oil, referred to as "tramp oil," will eventually also contribute to bacterial growth within the aqueous coolant, resulting in a foul odor and reducing the useful life of the aqueous coolant.

Due to environmental concerns, the oil-contaminated aqueous coolant must be treated as hazardous waste, and therefore represents an environmental and economic concern. Thus, tramp oil represents a serious environmental and economic problem with respect to maintaining proper and cost effective aqueous coolant use during machining operations.

A number of skimming devices have been developed over the years to remove tramp oil from the surface of aqueous coolant in a coolant tank for a machine. Disk skimmers include a disk which extends into the aqueous coolant and into contact with the tramp oil. Rotation of the disk near the surface results in removal of some oil from the surface, whereupon it is scraped by a blade and removed. Belt type skimmers involve an endless belt which removes tramp oil from the surface of the aqueous coolant, whereupon it is also scraped therefrom for removal. Disk and belt skimmers of this type are relatively inefficient and have space limitations for proper mounting and operation.

Floating tube skimmers and weir-type skimmers adapt to liquid level fluctuations, and they generally include a pump for pumping the skimmed liquid to a separation device. Such skimmers have proved to be acceptable in relatively large bodies such as lakes, ponds, rivers or even oceans. However, their size typically prevents their use in machining applications. In machining operations, most coolant tanks are as shallow as five or six inches, or as deep as 14 to 16 inches. Also, some machining coolant tanks are located in relatively inaccessible places without much spare space located adjacent thereto.

Weir-type skimmers also have the disadvantage of being too large to be readily adapted for machining operations. With floating tube or weir-type skimmers, liquid is retrieved from the tank via a suction line operatively connected to a suction pump. For most operations of this type, a positive displacement pump provides this suction force. Because the liquid removed from the tank includes a mixture of two different liquid components, and the proportions of these two liquid components vary over a period of use, the volume pulled by the pump is subject to variation. These volume variations can adversely affect the efficient operation of the pump and the entire system. Thus, while these relatively large size skimming devices have proved effective in their specific environment, i.e. large bodies of water, they suffer from some disadvantages which would be aggravated if the devices were to be adapted for use in relatively small coolant tanks.

In summary, in machining operations it is necessary to skim primarily tramp oil from the surface of the aqueous coolant in the tank (though the skimmed liquid will also include some coolant), to deliver the tramp oil coolant mixture to a separation unit, to separate the tramp oil from the aqueous coolant for collection, and to return the aqueous coolant to the tank for reuse.

It is an object of this invention to optimize the useful life of aqueous coolant used in conjunction with the operation of a machine tool. As a corollary, it is also an object of this invention to minimize the bacteria formation and hazardous waste conditions created by tramp oil contamination of such aqueous coolant.

It is another object of this invention to improve the skimming efficiency of an aqueous coolant skimmer, for varying liquid levels in the tank.

It is still another object of the invention to maintain consistency in liquid flow from a skimmer to a coalescer, thereby to optimize the useful life of the pump which causes the flow and to minimize the possibility of damage to the pump.

It is still another object of the invention to achieve the above-noted objects for a variety of differently sized and shaped tanks for collecting and holding aqueous coolant.

SUMMARY OF THE INVENTION

The present invention achieves the above noted objects by utilizing a skimmer with a submerged and enclosed housing located below the liquid level in a coolant tank, a vertically oriented, variable flow intake extending above the submerged housing, which skims free floating tramp oil from the surface of the liquid in the tank and conveys the skimmed liquid to the inside of the housing, and an outlet for continuously removing the skimmed liquid from the submerged housing to a coalescer, via pumping action. The intake includes a float which moves vertically with respect to the housing to accommodate variations in the liquid level in the tank, so that skimming always occurs near the surface. The housing also includes a sensor for determining the level of the skimmed liquid contained within the submerged housing, and this sensor controls the rate of skimming in-flow at the intake, so that the skimming rate is adjusted to compensate for fluctuations in out-flow from the submerged housing via the outlet. Such out-flow fluctuations generally result from pumping a liquid mixture which, over a period of time, undergoes viscosity changes due to variation in the relative proportions of the two liquid components.

The coalescer of this invention utilizes gravity flow operation through a circuitous flow path. This assures efficient separation of free floating tramp oil from aqueous coolant, aeration of the oil/coolant mixture after such separation, and return of the coolant to the tank so that it can be reused.

According to a preferred embodiment of the invention, the skimmer, or skimming unit, includes a substantially enclosed plexiglass housing adapted to be mounted to the inside wall of a coolant tank via magnets. An outlet tube connects to the housing, and a bottom end thereof extends into the housing to a position adjacent the bottom wall thereof. An intake structure also connects to the housing. The intake structure includes an inner tube which is fixed in vertical position relative to the housing, but which is vertically rotatable with respect thereto, about its vertical axis. An upper end of the inner tube includes a vertically oriented, elongated opening. An outer sleeve surrounds an upper end of the inner tube, and the outer sleeve also includes an opening partially aligned with the opening in the inner tube. The aligned portions of the two openings define an inlet for the skimmer. An external float connects to the outer sleeve, and the external float causes the outer sleeve to move vertically with respect to the inner tube, so that the inlet adjusts vertically with respect to the liquid level in the tank, thereby to skim adjacent the surface of the liquid and to obtain a liquid mixture which is predominantly tramp oil. Preferably, one end of the external float connects to the outlet, to prevent rotational movement of the outer sleeve about its vertical axis.

The skimmer also includes an inner float, located inside the submerged housing. The inner float connects to one end of a pivotal lever, the other end of which connects to the inner tube. The inner float moves vertically with respect to the liquid in the submerged housing, and this vertical movement pivots the lever to cause rotation of the inner tube about its vertical axis with respect to the outer sleeve, thereby changing the size of the inlet. When the inner float moves vertically downward, the lever pivots the inner sleeve to increase the size of the inlet, thereby increasing the flow rate into the submerged housing to compensate for the lower liquid level in the housing. Conversely, if the inner float raises upwardly, the lever pivots the inner tube to reduce the size of the inlet, thereby reducing the flow rate of the skimmed liquid into the submerged housing.

The system includes a pump which pumps the skimmed liquid from the submerged housing, whereupon it is fed to a coalescer for gravity separation of the tramp oil from the aqueous coolant. This separation occurs via flow through a circuitous flow path. The coalescer filters the mixture prior to flow along the flow path, and the coalescer also aerates the mixture at the last stage of the flow path. If desired, the mixture may be treated with ultraviolet radiation prior to entry into the flow path of the coalescer, thereby to kill bacteria which may have formed while in the tank.

With this invention, the useful life of aqueous coolant used in conjunction with the operation of a machine tool is prolonged, due to efficient removal and separation of tramp oil therefrom. This minimizes bacteria formation in aqueous coolant retained in the coolant tank, and it also minimizes the need to dispose of liquid hazardous waste, a need which arises when the aqueous coolant in the tank has been contaminated beyond useful life and therefore must be disposed of. As a corrolary to the longer useful life of the aqueous coolant, this invention also significantly reduces the need to dispose of aqueous coolant which has become contaminated beyond possible use, and reduces the total quantity of hazardous waste produced during machining.

Because the skimmer of this invention always skims at or near the surface of the liquid level in the tank, this invention improves skimming efficiency regardless of varying liquid levels in the tank. This improved skimming efficiency, in combination with the efficiency of the coalescer, also presents the opportunity of cycling the system off and on, so that it does not have to be operated continuously. This results in energy savings and longer pump life compared to prior continuously operating systems.

Because the skimmer includes structural components which vary the size of the inlet to compensate for liquid level fluctuations within the submerged housing, this invention maintains consistent liquid flow from the skimmer to the coalescer and consistent flow through the entire system. This optimizes the useful life of the pump used in conjunction with the coalescer, by minimizing the possibility of air intake to the pump.

Because of the compact nature of the skimmer, it may be mounted readily to the inside of a coolant tank by magnets. Also, the vertical dimensions of the intake may be varied to accommodate different standard operating levels in the tank. In other words, the skimmer may be readily adapted for use with tanks of various shapes and sizes, and for a variety of different standard liquid operating levels.

Similarly, the compact nature of the coalescer enables it to be mounted readily to any adjacent metal wall, as by magnets, thereby facilitating the step of assuring level orientation. The shape and configuration of the coalescer facilitates interconnection of the inlet and outlet hoses, and it also facilitates filtering and radiating the liquid mixture prior to conveyance along the circuitous flow path.

These and other features of the invention will be more readily understood in view of the following detailed description and the drawings.

DETAILED DESCRIPTION OF THE INVENTION

Figure 1:
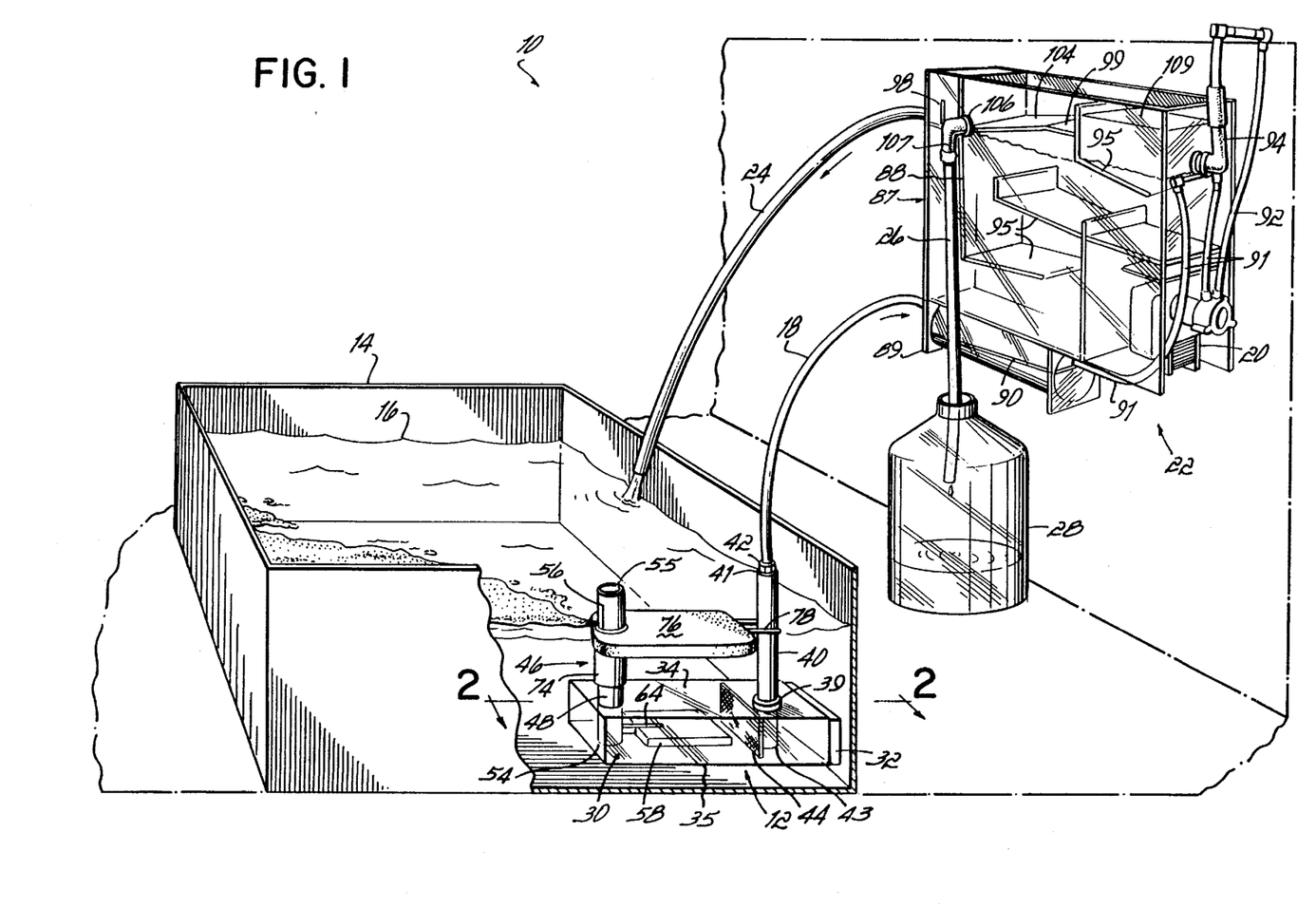
FIG. 1 is a schematic perspective view which schematically shows a skimmer/coalescer system for removing and separating tramp oil from an aqueous coolant, in accordance with a first preferred embodiment of the invention.

FIG. 1 shows a preferred embodiment of a skimmer/coalescer system 10 for separating free floating tramp oil from an aqueous coolant of the type typically used in machine tool cutting operations. The system 10 prolongs the useful life of the aqueous coolant. This reduces coolant costs, which is relatively expensive, and it minimizes the number of times it is necessary to shut down the machine tool to change or clean the coolant. The system 10 may also be used in conjunction with a parts washing system, to separate oil washed off of parts from the top of an aqueous solution, or in any other situation where a lighter, surface residing liquid must be removed and separated from a heavier liquid located below.

Generally, the system 10 includes a skimming unit, or skimmer 12, which skims the top surface of a liquid within a tank 14. If the system 10 is used in connection with a machine tool, the tank 14 holds a water-based coolant into which some quantity of machine tool lubricating oil inevitably leaks. Reference numeral 16 identifies the liquid level in the tank 14, and this usually represents a mixture of coolant and oil. If system 10 is used with a parts washer, liquid level 16 refers to a mixture of water and washed off oil. For a machine tool, the tank 14 may vary in height, ranging from as low as 5 inches to as high as 14 inches.

The system 10 removes the skimmed liquid from the tank 14 via a hose 18, and this liquid removal occurs via operation of a conventional positive displacement pump 20, such as a Gorman Rupp pump sold under Model No. 92462-000. For the system 10, as shown in FIG. 1, the pump 20 is preferably mounted to a coalescer, or coalescing unit 22. The coalescer 22 separates the two components of the liquid mixture. The coalescer 22 returns the purified or cleaned coolant to the tank 14 via a return line 24, and the coalescer 22 conveys the separated oil outwardly therefrom along an oil outlet line 26, which terminates in an oil collection container 28.

Figure 2:
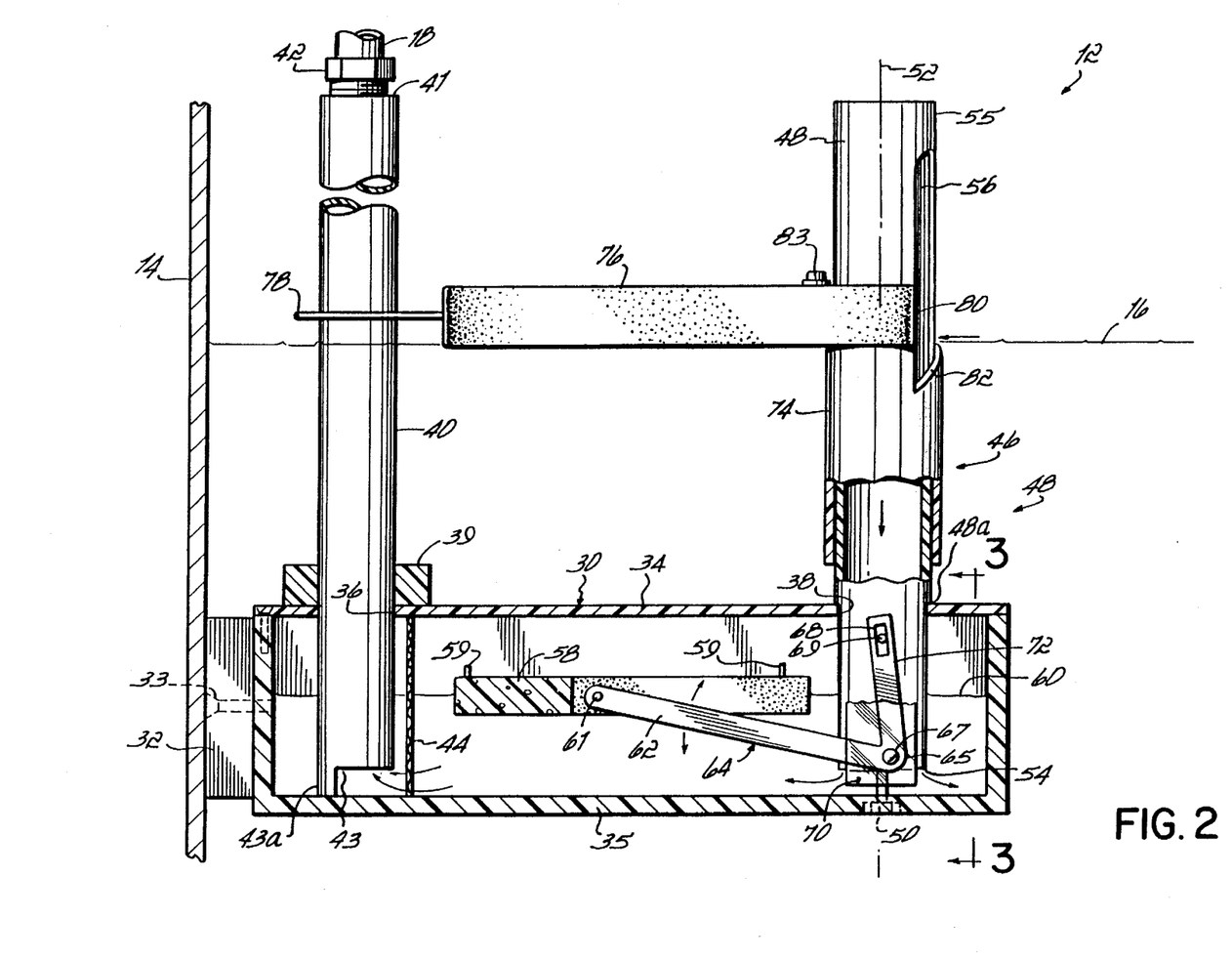
FIG. 2 is a longitudinal cross-sectional view taken on lines 2—2 of FIG. 1, showing a skimmer which forms part of the system.

FIG. 2 shows the skimmer 12 in greater detail. More specifically, FIG. 2 shows that the skimmer 12 includes a rigid substantially enclosed housing 30, preferably of plexiglass, to which a magnet 32 is secured, as by a bolt 33, to mount the skimmer 12 to a sidewall of the tank 14, which is typically metal. This enables the housing 30 to be mounted at any height in the tank 14. If the tank 14 is not metal, a metal piece may be secured thereto so as to span the range of normal mounting heights. The housing 30 is mounted at a level within the tank 14 such that it will be submerged well below the liquid level 16 in the tank 14. For some applications, the housing 30 may rest on the bottom of the tank 14.

The housing 30 includes an upper wall 34 with a pair of spaced holes formed therethrough. Reference numeral 36 refers to the first of the holes, while reference numeral 38 refers to the second of the holes. An outlet tube 40 extends through the first hole 36, with an optional surrounding gasket 39 providing a fluid tight interconnection therebetween. The outlet tube 40 may be formed of rigid plastic. A fitting 42 secures to an upper end 41 of the outlet tube 40 to secure hose 18 thereto. A lower end 43 of the outlet tube 40 extends downwardly toward a bottom wall 35 of the housing 30, with sufficient clearance therebetween to allow unobstructed outward fluid flow via hose 18 when the pump 20 is operating. If desired, the skimmer 12 may include a screen 44 located adjacent the bottom end 43 of the outlet tube 40, to minimize the possibility of particulate flow into the outlet tube 40 during operation. The bottom end 43 may include a depth stop 43a to allow accurate positioning with respect to the bottom wall 35.

Figure 3:
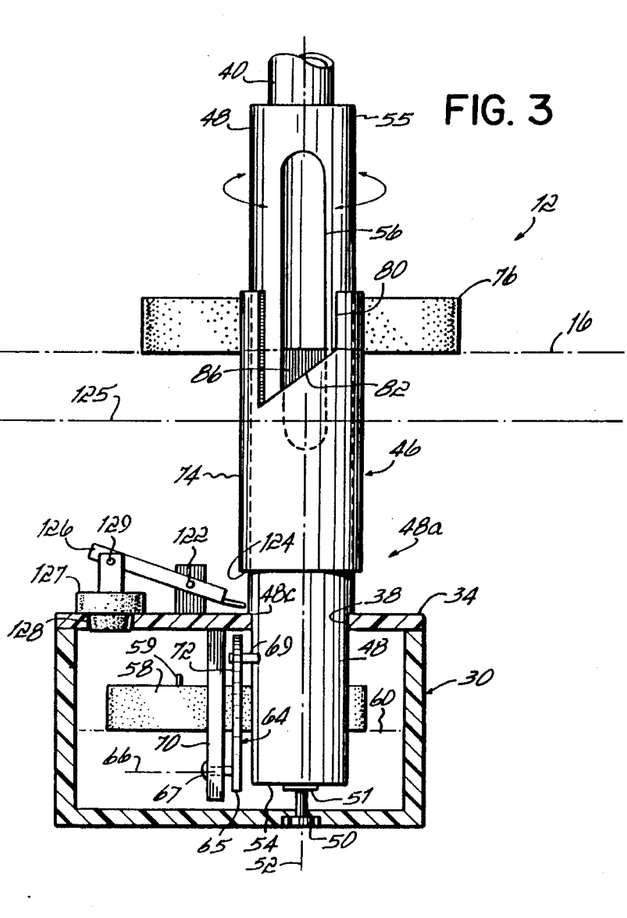
FIG. 3 is a transverse side view of the skimmer shown in FIG. 2.
Figures 3A, 5:
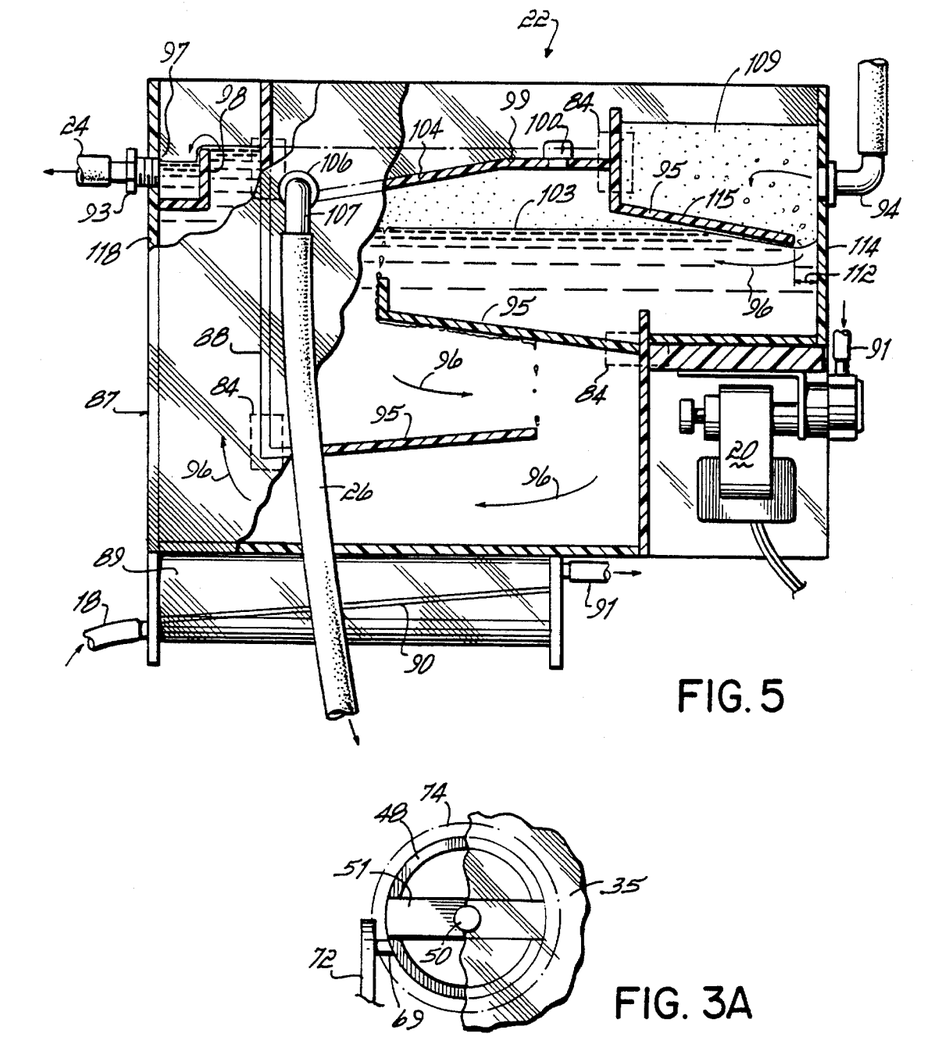
FIG. 3A is a bottom view of one end of the skimmer showing securement of the intake structure to the housing.
FIG. 5 is a front view in partial cross-section of a first preferred coalescer which forms part of the system shown in FIG. 1.

At an opposite end of the housing 30, an intake structure 46 extends vertically through the second hole 38. This intake structure 46 includes an inner tube 48, preferably of rigid plastic, which is secured to the bottom wall 35 of the housing 30 by a mechanical fastener 50 and bracket 51, as shown in FIG. 3A. The inner tube 48 is secured in a manner which prevents vertical raising or lowering with respect to the housing 30, but which allows rotational movement about a longitudinal axis 52 extending therethrough. In normal operation, this longitudinal axis 52 is oriented vertically.

As with the outlet tube 40, a bottom end 54 of the inner tube 48 is spaced from the bottom wall 35 of the housing 30, thereby to enable unobstructed flow of liquid into the housing 30 via the intake structure 46. An upper portion 55 of the inner tube 48 includes an elongated opening 56, preferably oriented vertically.

Within the housing 30, the skimmer 12 includes an internal float 58 which is buoyed by liquid therein, at a level which is indicated by reference numeral 60. The float 58 may be of any suitable buoyant material, such as styrofoam or cork. Preferably, a plurality of pins 59 extend upwardly from the float 58, to prevent surface contact, and hence surface tension, with the upper wall 34.

A rigid pin 61 pivotally secures a first leg 62 of a lever 64 to the internal float 58. An apex 65 of the lever 64 is secured to the housing 30 by a horizontally oriented pin 67 so that the lever 64 is rotatable about a fixed, vertical pivot axis 66 (FIGS. 2 and 3). More particularly, the pin 67 pivotally connects the apex 65 of the lever 64 to a vertical wall 70 located within the housing 30. Preferably, the wall 70 is made of the same components as the rest of the walls of the housing 30, and it is rigidly secured to the upper wall 34. This allows all of the components of the housing 30 to be removed for cleaning, simply by lifting upper wall 34. A second leg 72 of the lever 64 is connected to the inner tube 48 at a predetermined distance above the bottom end 54 thereof. The second leg 72 has a slot 68 which receives a pin 69, which is fixed to the inner tube 48. Rotation of lever 64 about axis 66 causes leg 72 to move left and right arcuately in a vertical plane (as viewed in FIG. 2) which causes rotational movement by inner tube 48.

Via rotation of lever 64 about axis 66, raising or lowering of the liquid level 60 in the housing 30 causes a corresponding rotation of the inner tube 48 with respect to its longitudinal axis 52. Preferably, the horizontal clearance between the inner tube 48 and the upper wall 34 of the housing 30, at the second hole 38, is about 0.007 inches. This allows rotation of the inner tube 48 with respect to the housing 30, but minimizes inflow of liquid into the housing 30 through the opening therebetween. The inner tube 48 also includes a shoulder 48a to further minimize leakage.

Figure 7:
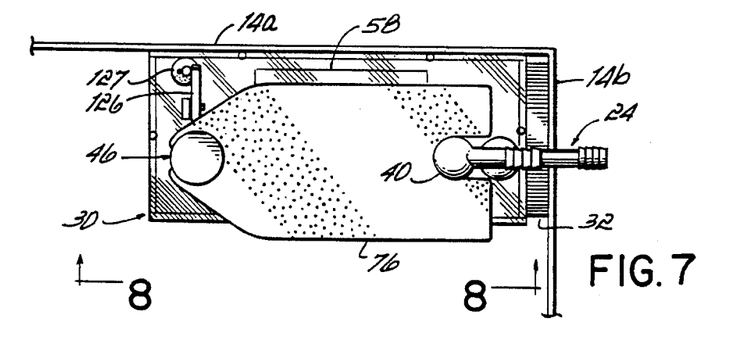
FIG. 7 is a top plan view of a second preferred embodiment of the skimmer of this invention, with the skimmer located in a tank.

An outer sleeve 74 telescopes over the upper portion 55 of the inner tube 48, with a preferable clearance therebetween of 0.040 inches. The sleeve 74 is preferably of rigid plastic, and is slidable with respect to the inner tube 48. A float 76 secures to the outer sleeve 74, and the float 76 preferably extends toward the outlet tube 40. The float 76 moves upwardly and downwardly within the tank 14, depending upon the liquid level 16 therein. Accordingly, the outer sleeve 74 moves upwardly and downwardly with the float 76. A pair of spaced rods 78 extend horizontally from the float 76 toward the outlet tube 40, and the rods 78 preferably have a spacing slightly greater than the diameter of the outlet tube 40. As shown in FIG. 7, alternatively, this function can be performed by extending the float 76 around the outlet tube 40. This prevents rotational movement of the outer sleeve 74 during rotation of the inner tube 48 about axis 52. Thus, the only movement permitted of the outer sleeve 74 is upward and downward, along the inner tube 48.

Figure 4:
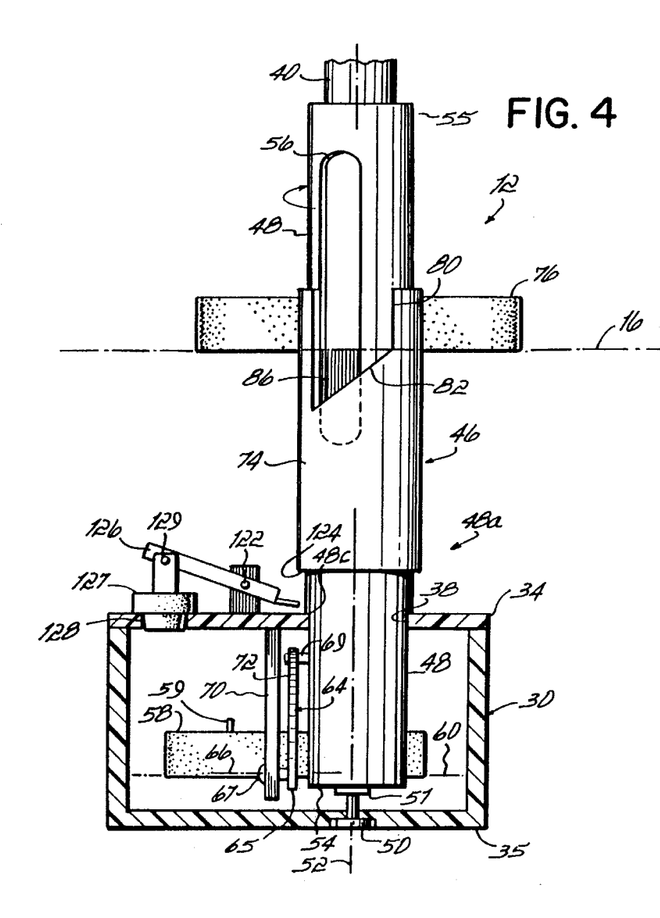
FIG. 4 is a transverse side view, similar to FIG. 3, but with the inner tube of the skimmer rotated from the position shown in FIG. 3.

The outer sleeve 74 includes a vertically oriented opening 80 formed therein. The opening 80 extends below the bottom of the float 76, and the opening 80 preferably includes an angled bottom 82. These features are best shown in FIGS. 3 and 4. The opening 80 in the outer sleeve 74 and the opening 56 in the inner tube 48 have some portions thereof which are in horizontal registration, or alignment, if viewed horizontally. These aligned portions are indicated by reference numeral 86, representing a shaded area. This shaded area 86 represents a fluid inlet for the intake structure 46. Because of the curve in the inner tube 48, the inlet 86 is actually a curved region.

Depending upon the liquid level 16 in the tank 14, and hence the position of the float 76, there will always exist some inlet 86 which represents the aligned portions of the opening 80 and the opening 56. As the float 76 raises and lowers with the liquid level 16, the inlet 86 raises and lowers. Because of the shape of the opening 80, and particularly the angled bottom 82 which extends below liquid level 16, liquid from the tank 14 flows into the inlet 86, through the intake structure 46 and into the housing 30. Because of the relative position of the inlet 86 with respect to the float 76, the liquid which flows into the intake structure 46 always comes from just below the top surface. Stated another way, the intake structure 46 skims the liquid just below the liquid level 16. This optimizes the efficiency of the skimming operation because all of the oil resides at or near the surface.

If desired, the skimmer 12 may include an adjustable screw 83 to vertically adjust the position of the float 76 with respect to the opening, to obtain the optimum position of angled bottom 82 in relation to the liquid level 16.

All other things being equal, the size of inlet 86 will remain the same, with the liquid intake to housing 30 being constant, regardless of the vertical level 16 and the position of the float 76. Depending on the depth of tank 14 and the typical liquid level 16 therein, the lengths of the inner tube 48 and the outer sleeve 74 may be shortened or lengthened as needed to accommodate the particular situation, without affecting the manner of operation or the efficiency of the system 10. However, the vertical drop between the inlet 86 and the housing 30 provides beneficial aeration of the skimmed liquid.

When inner tube 48 rotates with respect to outer sleeve 74, the rotation changes the cross-sectional area of alignment, i.e. the size of the inlet 86. As shown in FIG. 4, in comparison to FIG. 3, when the inner tube 48 rotates to the left, the size of inlet 86 increases, resulting in increased flow of liquid into the housing 30 via the intake structure 46. Correspondingly, if the inner tube 48 rotates to the right from the original position shown in FIG. 3, the size of the intake 86 decreases, resulting in decreased flow of liquid into the housing 30 via the intake structure 46.

Because rotation of the inner tube 48 depends upon the vertical level 60 of the internal float 58 with respect to the housing 30, the skimmer 12 compensates for raising or lowering of the liquid level 60 by decreasing or increasing, respectively, the flow of liquid into the housing 30 via the intake structure 46. This raising or lowering of the level 60 is caused by fluctuations in the overall viscosity of the liquid mixture pumped from the skimmer 12 to the coalescer 22. Despite the fluctuations in the rate of outflow from housing 30, the skimmer 12 automatically maintains a desired liquid level 60 in the tank 30, a level 60 which is well above the lower end 43 of the outlet tube 40. This optimizes operation of the pump 20 and minimizes the possibility of air flow into the hose 18 and subsequently to the pump 20 (FIG. 1), a problem to which pumps 20 of this type are susceptible over a period of time.

Thus, the skimmer 12 simultaneously provides the features of: 1) skimming the liquid from the tank 14 adjacent a top surface thereof, regardless of variations in the liquid level 16; 2) aerating the skimmed liquid immediately after intake; and 3) preventing the admission of air into the hose 18 or the pump 20. This results in delivery of an oil-rich liquid mixture to the coalescer 22, with optimum pump 20 operation.

As a corollary, because of the efficiency of the skimming and coalescing operations performed by the skimmer 12 and the coalescer 22, respectively, operation of the pump 20 may be cycled on and off by a timer 85 (FIG. 9), so that it does not have to run continuously. For instance, it may only be necessary to operate for fifteen minutes every hour. This represents a tremendous energy savings compared to continuous operation.

FIG. 5 shows the structural details of the coalescer 22, which separates free floating tramp oil from the aqueous coolant after it has been skimmed from the tank 14 by the skimmer 12. More particularly, the coalescer 22 includes a box-shaped housing 87 which may be made of plexiglass or any other rigid material. Use of plexiglass at least on the front side thereof provides the advantage of allowing the user to observe the effectiveness of the unit 22, if that is desired. A plurality of magnets 84 mount to a rear surface of the housing 87 to enable easy and properly aligned mounting to a metal surface at a convenient location. Alternate mounting methods maybe substituted, depending upon the circumstances and the space considerations. However, the mounting must assure level orientation during operation.

The hose 18 connects to the housing 87 at an isolated bottom region 89, in which a screen filter 90 spans the cross-sectional flow area. This filter 90 provides another degree of protection from the flow of particulates to the pump 20. An additional hose 91 interconnects the outlet of the bottom region 89 to the intake of the pump 20, and this additional hose 91 may be routed upwardly beyond the pump 20 to connect thereto from above. Yet another hose 92 extends from the pump 20 to an inlet 94 of the housing 87 (FIG. 1).

The housing 87 includes a plurality of angled baffles 95 which define a flow path therebetween, from the inlet 94 to an outlet 97 at the end of the flow path. The flow path is designated generally by directional arrows 96. The outlet 97 connects to the return line 24 via a fitting 93, to return cleaned coolant to the basin 14. To reach the outlet 97, the coolant must flow over a weir, or dam 98. While enroute to the outlet 97, oil contained within the liquid mixture tends to move upwardly because it is lighter than the aqueous coolant. Because of the upward angling of the baffles 95 and the overlapping center sections of the flow path 96, most of the oil in the liquid mixture remains within the center of the housing 87, or on the right side of an internal panel 88 in the housing 87.

The oil gradually moves upwardly along the bottom surfaces of the baffles 95, and it eventually accumulates beneath a central upper panel 99 of the housing 87. A cylindrical fitting 100 mounts to the upper panel 99 within a port formed therethrough, preferably by a press fit connection. This fitting 100 serves as an oil outlet from the flow path. An upper end 102 of the fitting 100 is located vertically above the weir 98, preferably at a vertical distance of 0.010" above the weir 98.

When the housing 87 is filled with liquid, the combination of fluid pressure flowing along the flow path 96 and upward floating movement of the oil causes the oil to move further upwardly inside the fitting 100, and eventually over the edge thereof. Stated another way, the upwardly flowing oil displaces the oil already located adjacent the top of fitting 100. Because of the manner in which the oil is displaced, it is critical that the coalescer 22 be mounted in a level orientation, with the top of fitting 100 located only slightly above, i.e. 0.010" above, the level of the weir 98. As,the oil spills over the outer end of the fitting 100, it flows downwardly along a top surface of an angled portion 104 of the panel 99, and eventually to an oil outlet 106. A fitting 107 in the outlet 106 connects the oil outlet line 26 thereto, with a fluid tight connection. Reference numeral 103 represents a vertical level, above which during use, the liquid is predominantly oil.

The coalescer 22 effectively separates free floating oil particles from aquaeous coolant, and the coalescer 22 requires no movable or adjustable parts. The only adjustment necessary is to set the flow rate, which is dependent upon the pressure of the pump 20, so that a first compartment 109 of the housing 87, located adjacent the inlet 94, does not overflow in the direction of the oil outlet 106. Nevertheless, if by chance the flow rate is too high, the mixture will spill from compartment 109 onto angled portion 104 and through outlet 106, rather than spilling onto the floor.

The space 112 between an end wall 114 of the housing 87 and a first baffle plate 115 bounding the compartment 109 may be varied, depending on the desired flow rate and/or operating pressure for the pump 20. Preferably, the first compartment 109 remains open-ended during operation, to remove any pump pulsations in the liquid mixture as it enters the housing 87 at the beginning of the flow path 96. Such pulsations could have an adverse effect on oil separation at the upper end 102 of fitting 100. In short, the open-ended first compartment 109 dampens the fluid pulses caused by the pump 90.

The coalescer 22 is located above the tank 14, so that the remaining coolant returns to the tank 14 via return line 24 by gravity, and the oil also flows along oil outlet line 24 to collection container 28 by gravity. If desired, the outlet 97 may be moved downwardly along one end wall 118 of the housing 87. This would enable both hose connections to the housing 87 to be located adjacent one another, thereby to better accommodate convenient routing of the hoses within given space requirements.

In operation, the skimmer 12 is mounted inside the tank 14 via magnets 32, thereby submerging the housing 30 at a desired position well below the normal operating liquid level 16. This mounting may be done with the tank 14 filled, or in an empty condition. The coalescer 22 is connected to the skimmer 12, via hose 18 and return line 24, with lines 91 and 92 in place. The oil outlet line 26 and the oil collection container 28 are also connected to the coalescer 22. The pump 20 is then activated. This initially causes the pump 20 to suck air for a short period of time, i.e. ten seconds, followed by skimmed withdrawal of liquid from the housing 30. Preferably, the pump 20 operates in the range of about 20–26 gallons per hour, and applicant has had success with a rate of 24 gallons/hour.

During skimming, the intake structure 46 continuously skims the top surface of the liquid in the tank 14, just below liquid level 16. Stated another way, the liquid from the tank 14 continuously flows into intake structure 46 via inlet 86, and the inlet 86 is always located just below the liquid level 16, regardless of the vertical position of liquid level 16. If the liquid level 60 in the housing 30 recedes, which may occur due to changes in pressure and/or flow in line 18, the internal float 58 lowers and pivots lever 64 about its horizontal pivot axis 66, thereby rotating the inner tube 48 with respect to the outer sleeve 74 and expanding the size of the inlet 86. This increases the liquid flow into the housing 30 to compensate for the receding of the liquid level 60. Conversely, if the liquid level 60 rises, the lever 64 pivots in the opposite direction, thereby rotating inner tube 48 with respect to outer sleeve 74 and reducing the size of the inlet 86. This slows the flow rate of liquid into the housing 30 to compensate for the raising of the liquid level 60.

As the liquid level 60 raises or lowers with fluctuations in pressure or flow, the skimmer 12 compensates with a corresponding decrease or increase, respectively, in liquid flow through inlet 86. Thus, the liquid level 60 remains relatively constant, and at a desired level above the bottom end 43 of the outlet tube 40. Because the liquid level 60 is always above the bottom end 43 of the outlet tube 40, the skimmer 12 prevents any sucking of air into the hose 18 or the pump 20. In summary, the skimmer 12 effectively skims liquid from adjacent top surface, to optimize the efficiency of the system 10, and it actively prevents air intake to the pump 20, which would cause damage if the pump pumped air for an extended amount of time, i.e. 2–3 minutes.

Additionally, the skimmer 12 provides another level of safety. If the liquid level 16 in the tank 14 recedes below a predetermined caution level 125 (see FIG. 3), a bottom end 124 of the outer sleeve 74 contacts a lever 126 mounted to the upper wall 34 of the housing 30 and causes the lever 126 to pivot about a horizontal axis aligned with a pivot point 122. This pivotal motion of the lever 126 about pivot point 122 unseats a normally closed plug valve 127 from a port 128 formed in the upper wall 34. The plug valve 127 is hingedly connected to the lever 126 by a pin 129. The unseating of plug 127 allows liquid to flow directly into the housing 30, from a level well below the inlet 86. Although this liquid will predominantly be coolant, the main concern in this instance is to prevent air intake to the pump 20. This immediate concern outweighs the efficiency concern of skimming a predominantly oil-rich liquid mixture from the top. This latter concern will become important again after normal operation resumes.

The system 10 itself does not include any additional safety features if the liquid level 16 should by chance recede below the level of the upper wall 34. However, because there is no limitation as to how low the housing 30 may be placed within the tank 14, this should not really present a problem for the operator. If desired, separate safety controls may be connected to the tank 14 to determine an extremely low liquid level condition. However, for the most part, if the liquid level 16 recedes to such an extremely low depth, there most likely will be other problems with operation of the coolant system and/or the machine tool which will draw the attention of the operator.

Because of the manner in which the skimmer 12 operates, it can accommodate tanks 14 of virtually any depth, so long as the lengths of the inner tube 48 and the outer sleeve 74 are chosen to accommodate the normal range of liquid levels 16 for the particular tank 14 selected.

The skimmed liquid flows from the skimmer 12 to the coalescer 22. More specifically, the skimmed liquid flows into the bottom region 89 for an additional stage of filtering, into the pump 20 and eventually to the inlet 94. The liquid is removed of any pump pulsations in the first compartment 109 of the coalescer 22. Thereafter, the liquid mixture flows along the flow path 96, which extends snakelike back and forth through the central portion of the housing 87, before reaching the vertically oriented internal panel 88. While enroute to the outlet 97, oil within the liquid mixture tends to raise upwardly because it is lighter than the aquaeous coolant, and it eventually contacts the bottom surfaces of the angled baffles 95. The angling of the baffles 95 causes the collected oil to move upwardly in a desired direction, and eventually, the oil collects adjacent upper wall 99.

Figure 6:
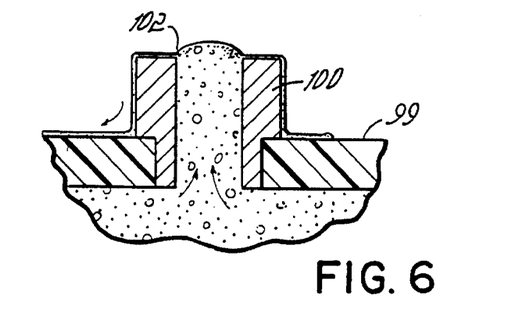
FIG. 6 is an enlarged cross-sectional view of an oil outlet which is part of the coalescer.

As the aquaeous coolant spills over the weir 98 and out the outlet 97, fluid pressure in the housing 87 builds and more oil accumulates adjacent the bottom of wall 99. Eventually, the oil moves upwardly through the inside of the fitting 100, as best shown in FIG. 6. The oil then flows downwardly from the fitting 100, and onto the top of the upper plate 99. It then flows through the oil outlet 106, along the oil outlet line 26 and to the oil collection container 28.

During pump 20 operation, the skimmer 12 continuously skims the oil/coolant liquid mixture from the tank 14, while the coalescer 22 separates the free floating tramp oil from the mixture and simultaneously returns the coolant to the tank 14 and conveys the separated oil to the container 28. So long as the system 10 operates, the proportion of oil to coolant in the tank 14 becomes lower.

FIG. 7 shows a second preferred embodiment of the skimmer 12 of this invention. In this embodiment, the external float 176 is extended horizontally to encompass, or surround, the outlet 40. With this structure, the float 176 itself serves the purpose of the brackets 78 shown in the other preferred embodiment, in FIG. 2.

FIG. 7 also shows the benefits of the overall shape of the skimmer 12 in accordance with this invention. More specifically, FIG. 7 shows that the skimmer 12 may be mounted adjacent two sidewalls, designated 14a and 14b, of the tank 14. In this mounting arrangement, the sides of the float 176 are spaced from the walls 14a and 14b, so that surface contact therebetween is prevented. Such surface contact would adversely affect the ability of the float 176 to move vertically with respect to fluctuations in the liquid level 16 in the tank 14.

Figure 8:
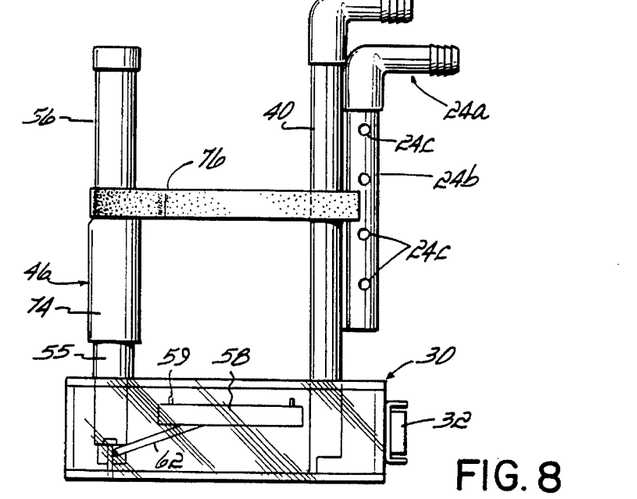
FIG. 8 is a side view of the skimmer shown in FIG. 7, as viewed along lines 8—8 of FIG. 7.

FIG. 8 shows a side view of the skimmer 12 shown in FIG. 7. FIG. 8 also shows a preferred manner of returning the filtered aquaeous coolant to the tank 14. This is done via return line connector 24a and return line outlet 24b. Preferably, return line outlet 24b includes a plurality of vertically spaced holes 24c formed therethrough, and the bottom end of the return line outlet 24b is also open. The external float 176 does not contact the outlet 24b, but return line outlet 24b is secured to outlet 40 in any suitable manner, as by glue.

With this structure, coolant returned to the tank 14 may flow out of any of the holes 24c or from the bottom end of the return line outlet 24b, depending upon the liquid level 16 in the tank 14. Applicant learned that it became necessary to mount the return line 24 to the tank 14, to assure that filtered coolant would be returned thereto and not spilled outside the tank 14. However, if the end of the return line 24 became submerged below the liquid level 16, liquid gravity flow through the coalescer 22 was inhibited and system 10 operation was also therefore inhibited.

The outlet structure shown in FIG. 8 solves this problem, by letting the filtered aquaeous coolant flow into the tank 14 from any one of a plurality of different vertical levels. This solution also provides another corollary benefit, which is more readily appreciated when viewing FIG. 7. Because of the location of this return line outlet 24b relative to the rest of the skimmer 12, the return coolant will flow into the tank 14 adjacent the wall 14b. This creates a flow of coolant around the elongated sides of the float 176, and this flow effectively prevents accumulation of tramp oil along the walls 14a and 14b of the tank 14, and it promotes movement of the tramp oil toward the intake.

Another benefit which results from this structure relates to convenience in interconnection and cleaning the system 10, because connections for the outlet and the intake of the skimmer 12 are located right next to each other.

Figure 9:
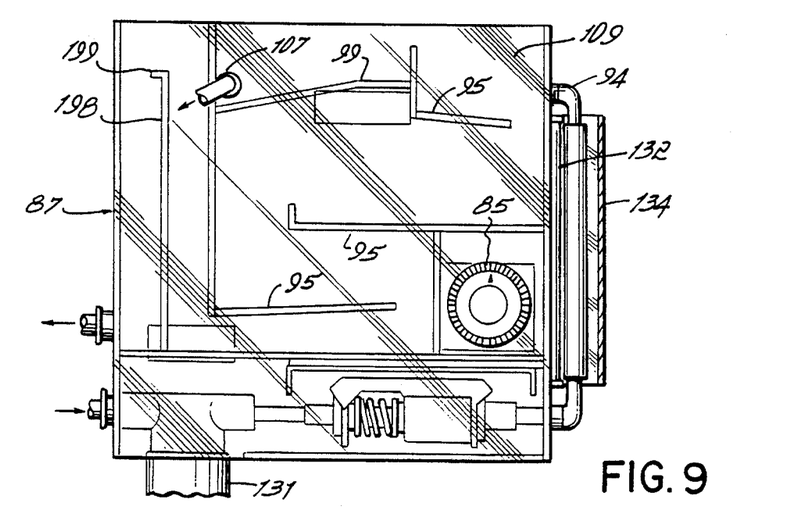
FIG. 9 is a front view in partial cross section, similar to FIG. 5, of a coalescer constructed in accordance with a second preferred embodiment of the invention.

Similarly, FIG. 9 shows a second preferred embodiment of the coalescer 22. With this embodiment, the flow path is reconfigured somewhat to increase the vertical length of the weir 198 at the end of the flow path. This increases the dimension of the vertical column of liquid adjacent the outlet 97, thereby to better accommodate normal liquid level fluctuations during operation. It also enables the inlet and outlet for the coalescer 22 to be connected at convenient and adjacently located positions. Preferably, the weir 198 includes a horizontally extending removable lip 199, which under certain desired conditions helps to aerate the separated aquaeous coolant as it flows or spills toward the outlet 97.

The coalescer 22 shown in FIG. 9 also includes a removably connected filter 131 which is easily removable for cleaning. The filter 131 includes a bottom cup which threadably connects to an upper inline portion. This allows easy disconntection and removal of debris.

The coalescer configuration shown in FIG. 9 is somewhat more compact, and due to the location of the pump 20, it makes more efficient use of space. The timer 85 is also located adjacent the pump 20, to provide cycled operation during a predetermined duration of time, at regularly occurring intervals. As stated previously, this is made possible by the efficient skimming operation of the skimmer and the efficient coalescing operation of a coalescer. Because both of these units operate so efficiently, there is no need to continuously run the pump 20.

FIG. 9 also shows that the coalescer may be equipped with yet another feature. This involves the mounting of a radiation device 132, such as a UV light, along the outside of the coalescer 22, with a U-shaped reflective mirror 134 spaced therefrom, with the feedline for the coalescer 22 located therebetween. By radiating the liquid mixture prior to flow into the coalescer 22, bacteria within the mixture are killed or neutralized. Again, this promotes longer useful life of the aquaeous coolant.

While these and other features of a skimmer/coalescer system 10 in accordance with a preferred embodiment of the inventions have been described, it is to be understood that the invention is not limited thereby and in light of the present disclosure, various other alternative embodiments will be apparent to one of ordinary skill in the art without departing from the scope of the invention. For instance, the invention has been described with respect to use in conjunction with a machine tool, for skimming and separating tramp oil from aquaeous coolant. As noted at the outset, this same structure and operation may also be used in conjunction with a parts washer. Accordingly, applicant intends to be bound only by the following claims.

I claim:

1. A skimming apparatus for skimming a liquid mixture of at least two liquid components from a tank containing the mixture, comprising:

a bracket;

a substantially enclosed housing mounted to the bracket to locate the housing in the tank at a vertical position below a normal operating level for the liquid mixture contained therein;

an outlet tube secured to the housing and having a bottom end extending into the housing, the outlet tube adapted to convey liquid outwardly from the housing via the bottom end;

an intake structure secured to the housing, the intake structure having an upper end which floatably adjusts with respect to the level of the liquid mixture in the tank to gravitationally convey liquid into the housing via an inlet located adjacent the upper end; and a mechanical sensor located in the housing and operatively connected to the intake structure to vary the size of the inlet depending on the depth of liquid in the housing, thereby to maintain a liquid level in the housing above the bottom end of the outlet tube.

2. The skimming apparatus of claim 1 wherein the intake structure further comprises:

an inner tube secured to the housing, the inner tube having a slot adjacent the upper end;

an outer sleeve telescopically received on the inner tube, the outer sleeve having an opening at least partially aligned with the slot and thereby defining the inlet for the intake structure; and a first float secured to the outer sleeve to vertically move the outer sleeve with respect to the inner tube, depending on the liquid level in the tank, thereby to vertically move the inlet with respect to the housing to maintain the inlet at a desired position with respect to the level of the liquid in the tank.

3. The skimming apparatus of claim 2 wherein the inner tube is rotatable with respect to the housing, the mechanical sensor further comprising:

a second float vertically movable in the housing depending on the liquid level therein;

a lever pivotally connected to the housing, the lever having a first end secured to the second float and a second end secured to the inner tube, whereby vertical movement of the second float pivots the lever to cause rotation of the inner tube with respect to the outer sleeve, which in turn varies the amount of the slot which is aligned with the opening.

4. The skimming apparatus of claim 3 wherein the opening of the outer sleeve has an angled bottom, and rotation of the inner tube with respect to the outer sleeve varies the vertical distance between the liquid level in the tank and a bottommost portion of the inlet.

5. The skimming apparatus of claim 3 and further comprising:

a brace connected to the first float and cooperatively interacting with the outlet tube to prevent rotation of the outer sleeve during rotation of the inner tube.

6. The skimming apparatus of claim 5 wherein the brace further comprises a pair of spaced members engaging opposite sides of the outlet tube.

7. The skimming apparatus of claim 5 wherein the brace is an integral part of the first float.

8. The skimming apparatus of claim 1 and further comprising:

a second lever pivotally connected to the housing, a first end of the second lever adapted to be engaged by a bottom end of the outer sleeve when the liquid level in the tank recedes to a predetermined warning level; and a valve plug secured to a second end of the lever and seated within a port in the housing, the second end of the second lever adapted to unseat the valve plug upon engagement of the first end of the second lever by the outer sleeve, thereby to permit flow of liquid into the housing from a level below the surface.

9. A skimming apparatus for skimming liquid from a tank, comprising:

a substantially enclosed housing for location below a normal liquid level of the tank;

an outlet tube connected to the housing and having a lower end located in the housing at a predetermined lower position, for conveying liquid in the housing outwardly therefrom; and an intake structure connected to the housing for conveying liquid from the tank into the housing via an inlet, the intake structure further including, a first float for vertically adjusting the vertical position of the inlet with respect to the liquid level in the tank, to maintain the inlet adjacent the surface of the liquid in the tank regardless of variations of the liquid level in the tank, and a second float located in the housing and vertically movable in the housing depending on the liquid level therein, and operative to vary the size of the inlet, thereby to vary the rate of liquid flowing into the housing and to maintain a liquid level in the housing above the predetermined lower position.

10. The skimming apparatus of claim 9 wherein the intake structure further comprises:

an inner tube secured to the housing in substantially vertical orientation and rotatable about a vertical axis thereof, the inner tube having an elongated vertical slot adjacent an upper end thereof, the second float operative to rotate the inner tube about the vertical axis in first and second directions upon raising and lowering, respectively, of the liquid level in the housing; and an outer sleeve telescopically received on the inner tube and secured to the second float to move vertically therewith depending on the liquid level in the tank, the outer sleeve having an opening partially aligned with the slot in the inner tube, the alignment of the slot and the opening defining the inlet and the rotation of the inner tube with respect to the vertical axis causing the size of the inlet to vary to maintain the liquid level in the housing above the predetermined lower position.

11. The skimming apparatus of claim 10 wherein the opening has an angled bottom edge and rotation of the inner tube with respect to the outer sleeve causes a bottom edge of the inlet to move vertically with respect to a surface level of the liquid in the tank.

12. A skimming/coalescing system comprising:

a substantially enclosed housing for location below a normal liquid level of the tank;

an outlet tube connected to the housing and having a lower end located in the housing at a predetermined lower position, for conveying liquid in the housing outwardly therefrom; and an intake structure connected to the housing for conveying liquid from the tank into the housing via an inlet, the intake structure further including, a first float for vertically adjusting the vertical position of the inlet with respect to the liquid level in the tank, to maintain the inlet adjacent the surface of the liquid in the tank regardless of variations of the liquid level in the tank, and a second float located in the housing and vertically movable in the housing depending on the liquid level therein, and operative to vary the size of the inlet, thereby to vary the rate of liquid flowing into the housing and to maintain a liquid level in the housing above the predetermined lower position, a pump operatively connected to an opposite end of the outlet tube for pumping liquid from the housing; and a coalescer operatively connected to the pump to receive the liquid mixture and to separate and collect a first liquid component therefrom, the first liquid component having a lower density than the remainder of the liquid, and the coalescer also returning the remainder of the liquid to the tank.

13. The skimming/coalescing system of claim 12 wherein the coalescer further comprises:

a housing having an entry port and a first exit port and a flow path therebetween, the entry port operatively connected to the pump and the first exit port operatively connected to the tank via a return line, the pump mounted to the housing;

the housing including at least one angled baffle located along the flow path, and a centrally located upper baffle defining an upper boundary of the flow path thereat, the upper baffle having an aperture therein; and a hollow fitting mounted in the aperture, a top end of the fitting located vertically above the first exit port, whereby the first liquid component moves upwardly through the fitting and outwardly from the housing via a second exit port.

14. The system of claim 13 and further comprising:

means for mounting the housing to a vertical surface.

15. The skimming/coalescing system of claim 12 and further comprising:

a return line having first end and second ends, the first end operatively connected to the coalescer to receive said remainder of the liquid and the second end secured to the outlet tube, the second end further including at least two discharge outlets located at different vertical levels.

* * * * *